UNITED STATES PATENT OFFICE.

JAMES A. WHEELER, OF NEW YORK, N. Y.

PROCESS OF MOLDING FIBROUS PULP.

SPECIFICATION forming part of Letters Patent No. 625,372, dated May 23, 1899.

Application filed April 20, 1898. Serial No. 678,255. (No specimens.)

*To all whom it may concern:*

Be it known that I, JAMES A. WHEELER, of New York, in the county of New York, in the State of New York, have invented new and useful Improvements in Processes of Molding Fibrous Pulp, of which the following is a full, clear, and exact description.

This invention relates chiefly to the process described in my Letters Patent No. 539,928, dated May 28, 1895.

The object of my present invention is to give more body to the finished product and to increase the solidity thereof by simple and inexpensive means; and to that end the invention consists, essentially, in the addition of ashes and in some cases also talc to the materials employed in the process described in my said Letters Patent.

The chief material in the compound to be treated and molded is fibrous pulp, preferably wood-pulp, except in case where the compound is to be fireproof, in which case I use asbestos fiber mixed with pulverized incombustible material, which may be either ashes or talc, or both, preferably finely sifted. The fibrous material thus produced I moisten with water, preferably of a temperature near boiling-point, to melt or dissolve other ingredients, hereinafter mentioned, and to expedite the drying of the article molded from the compound. By this moistening the pulp is rendered pasty, and I then mix therewith sodium silicate or silicate of potash, which produces a doughy body, which is to be thoroughly kneaded and which by exposure to air and heat becomes solidified, and by combining with said doughy body pulverized lime it is caused to solidify as hard as stone and rendered capable of resisting chemical action.

When the finished article is to be white, I mix with the aforesaid compound either white lead or zinc-white or slaked quicklime.

By adding pulverized resins or gums to the compound while the latter is heated sufficiently to melt said resins or gums a homogeneous mass is obtained, which hardens with a beautiful luster. The compound thus prepared is specially well adapted for forming therefrom bath-tubs and other articles liable to be subjected to alkali-soaps and hot water, which does not affect said compound. This compound is further improved by adding thereto calcined pulverized magnesite soaked in chlorid of magnesia or suitable oxids, which may be soaked with chlorid of magnesia. The mixture is to be thoroughly kneaded and then molded in the desired shape by means of dies or molds made for that purpose. The material is to be allowed to set and harden in the mold, and the molded article may be removed from the mold and baked in a suitable kiln and is thereby hardened to such a degree as to allow it to be finished by either a cutting or polishing tool. The molded article may be further hardened by a coat of a solution of chlorid of magnesia or other chlorids applied by a brush or other suitable means.

What I claim as my invention is—

1. The treatment of fibrous pulp by mixing therewith pulverized incombustible material, then moistening the mixture with hot water, then adding to said mixture sodium silicate, then kneading the mass and adding quicklime thereto, then mixing pulverized resins with the mass while heated.

2. The treatment of fibrous pulp by mixing therewith pulverized incombustible material, then moistening the mixture with hot water, then adding to said mixture sodium silicate, then kneading the mass and adding quicklime thereto, then mixing pulverized resins with the mass while heated, then adding to said mass calcined pulverized magnesite soaked in chlorid of magnesia and again kneading the mass and finally molding it, as set forth.

JAMES A. WHEELER.

Witnesses:
PAUL ARMITAGE,
GEORGE D. MUMFORD.